United States Patent Office 3,057,925
Patented Oct. 9, 1962

3,057,925
METHOD OF PRODUCING HALOGEN-DIPHENYLSULPHONES
Cornelis Johannes Schoot, Emmasingel, Eindhoven, and Cornelis Marinus Eduard Baans, Hemdijk, Amsterdam, Netherlands, assignors to North American Philips Company Inc., New York, N.Y., a corporation of Delaware
No Drawing. Filed May 15, 1959, Ser. No. 813,326
10 Claims. (Cl. 260—607)

Our invention relates to a method of producing halogen-diphenylsulphones by the reaction of halogen-benzenesulphohalide with a benzene, one or more hydrogen atoms of which may be replaced by halogen atoms, in the presence of a condensation agent.

The production of diphenylsulphones by a reaction of benzene-sulfohalide and benzene or a derivative thereof in the presence of a condensation agent, for example, aluminum chloride or ferric chloride is known.

The production of halogenated-diphenylsulphones by the so-called Friedel-Crafts reaction is also known. For example, in Dutch patent specification No. 81,359 there is described the production of 2,4,5,4'-tetrachlorodiphenyl-sulphone from 2,4,5-trichlorobenzene sulphochloride and monochlorobenzene, in the presence of aluminum chloride.

It has now been found that the yields of halogen-diphenylsulphone produced by this reaction may exhibit fairly great fluctuations.

It is therefore a principal object of the invention to provide a means of preparing halogen-diphenylsulfones by the condensation of a halogenated benzene-sulfohalide and halogenated or non-halogenated benzene in which there is a consistantly high yield of the halogen-diphenyl-sulfone.

These and other objects of the invention will be apparent from the description that follows:

The applicants have found that these fluctuations in the yield of the sulphone are very often due to the influence of by-products, which are obtained in small quantities with the production of halogen-benzenesulphohalide and contaminate it. These by-products are, probably, sulphur-containing compounds, in which sulphur is contained in its bi- or tetravalent form. These by-products are likely to accelerate a reaction which is competitive to the formation of halogen-diphenylsulphone, i.e., the formation of sulphinic acid. The more sulphur-containing compounds of the said kind are contained in the sulpho-halide the more sulphinic acid and the less halogen-diphenylsulphone will be obtained.

According to the invention we have found that the fluctuations in the yields of sulphones may be obviated by treating the halogen-benzene sulphohalide with an oxidizing agent, so that yields of sulphone are obtained which are wholly or substantially wholly equal to the high yields of the sulphone obtainable by means of pure halogen-benzene sulphohalides.

More particularly according to our invention we produce phenylsulphones by the reaction of a halogen-benzene sulphohalide with benzene, of which one or more hydrogen atoms may be replaced by halogen atoms, in the presence of a condensation agent, for example, aluminum chloride or ferric chloride and treat the halogen-benzene sulphohalide, prior to or during the reaction, with an oxidizing agent.

As oxidizing agents we may use a large number of different agents, for example, nitric acid and salts thereof, such as ferric nitrate, sodium nitrate, potassium nitrate, barium nitrate, manganese nitrate and zinc nitrate, ferric chloride, chlorates, chromates and bichromates, finely divided manganese dioxide, manganates and permanganates, hydrogen peroxide and organic peroxides, such as ether peroxide.

We have found that particularly nitric acid and nitrates yield very good results.

Nitric acid may be used in practically any concentration. When using diluted nitric acid (5 to 30% by weight), it is useful to add a greater quantity of aluminum chloride to the condensation reaction, since the water contained in the nitric acid inactivates part of the chloride. When using about 60% by weight of nitric acid or a higher concentration, nitration of the benzene ring may occur. Use is therefore preferably made of about 50% by weight of nitric acid.

The oxidizing agents suitable for the method according to the invention dissolve not at all or only to a small extent in the halogenated-benzene sulphohalide to be treated.

The quantity of oxidizing agent to be used varies to some extent with the halogenated-benzene sulphohalide to be employed; use is preferably made of a quantity of oxidizing agent capable of yielding 0.002–0.2 g. eq. of oxygen per gram molecule of sulphohalide to be treated and especially the quantity capable of yielding 0.02–0.1 g. eq.

It has been found that the treatment of halogen-benzene sulphohalide with an oxidizing agent may be carried out advantageously some time prior to, for example at least 5 minutes prior to the addition of this sulphohalide to the other components used in producing halogen-diphenyl-sulphones.

The treatment of halogenated benzene sulphohalide with the oxidizing agent is preferably carried out with liquid sulphohalide at a temperature between about 70 and 100° C.

The method according to the invention has proved to be particularly suitable for the production of polychloro-diphenylsulphones from 2,4,5-trichlorobenzene sulphochloride and a chlorinated benzene, especially monochlorobenzene, in the presence of aluminum chloride as a condensation agent.

Other examples of halogenated benzene that may be employed are 2,3-dichlorobenzene, 3,4,5-trichlorobenzene, monofluorobenzene, 1,2-dibromobenzene, 2,5-diodobenzene and 1,3,6-dichlorobenzene.

Other examples of halogenated benzene-sulphohalide that may be employed are the 2,3-dichlorobenzene sulphochloride, p-chlorobenzene, sulphochloride and 3,5-dibromobenzene sulfochloride.

In these cases very suitable oxidizing agents have proved to be nitric acid and nitrates. For practical purposes the nitrates and, particularly, sodium nitrate are preferred.

The treatment of halogen-benzene sulphohalide may form part of a continuous process for producing halogen-diphenylsulphone.

The invention will be now explained with reference to the following example and table.

*Example*

2,4,5,4'-tetrachlorodiphenylsulphone was produced by mixing, each time, 56 g. of a commercially produced 2,4,5-trichlorobenzenesulphochloride (final melting point 65.5° C.), at a temperature between 90 and 95° C., with 37 g. of aluminum chloride and by adding, at the same temperature, 40 cc. of monochlorobenzene, while stirring and by heating subsequently the mixture at a temperature of 125 to 130° C., for 3 to 5 minutes. After about 15 minutes the sulphone obtained was processed further in the conventional manner. By pouring out the reaction mixture in water the complex of the sulphone and the aluminum chloride was decomposed. The aluminum hydroxide separated out and is dissolved, by adding hydrochloric acid, while the remaining sulphone was filtered off, washed with water and dried.

Experiments were carried out with crude sulphochloride and with sulphochloride treated with the quantities and kinds of oxidizing agents indicated in the table below. The treatment with the oxidizing agent took place by stirring it at about 95° C. with the sulphochloride for 5 minutes. After this treatment the sulphochloride was directly used for the production of the sulphone. Unused oxidizing agent, if any, was not removed.

The table indicates the yields of 2,4,5,4'-tetrachlorodiphenylsulphone, calculated on the basis of the quantity used of 2,4,5-trichlorobenzene sulphochloride. The quantities of oxidizing agent are given in percent by weight of anhydrous compound, calculated on 2,4,5-trichlorobenzene sulphochloride.

It should be noted that, if aluminum chloride is used as a condensation agent, a small quantity of water, preferably 0.2 to 2% by weight, calculated on aluminum chloride, in the reaction mixture used for the sulphone production is conducive to the yield of sulphone. A particularly suitable method of applying the water consists in conducting moist air through the mixture of the halogenated benzenesulphochloride and aluminum chloride or through the finely divided aluminum chloride.

*Table*

| Quantity employed → <br> Oxidizing agent ↓ | 0 | 1.5 | 1.0 | 0.5 | 0.3 | 0.2 | 0.02 | 0.01 |
|---|---|---|---|---|---|---|---|---|
| Nitric acid (50%) | 50 | 81 | 81 | 81 | ---- | 82 | ---- | 67 |
| Sodium nitrate | 50 | 78 | 77 | ---- | ---- | 78 | ---- | 64 |
| Potassium nitrate | 50 | ---- | 77 | ---- | ---- | ---- | ---- | ---- |
| Ammonium nitrate | 50 | ---- | 77 | ---- | ---- | ---- | ---- | ---- |
| Barium nitrate | 50 | ---- | 78 | ---- | ---- | ---- | ---- | ---- |
| Lead nitrate | 50 | ---- | 78 | ---- | ---- | ---- | ---- | ---- |
| Potassium chlorate | 50 | ---- | 74 | ---- | ---- | ---- | ---- | ---- |
| Potassium chromate | 50 | ---- | 74 | ---- | ---- | ---- | ---- | ---- |
| Potassium bichromate | 50 | ---- | 70 | ---- | ---- | ---- | ---- | ---- |
| Potassium permanganate | 50 | ---- | 66 | ---- | ---- | ---- | ---- | ---- |
| Manganese dioxide | 50 | ---- | 59 | ---- | ---- | ---- | ---- | ---- |
| Hydrogen peroxide (30% solution) | 53 | ---- | ---- | ---- | 60 | ---- | ---- | ---- |
| Ferrichloride | 50 | ---- | 67 | ---- | ---- | ---- | ---- | ---- |
| Potassium peroxydisulfate | 50 | ---- | 58 | ---- | ---- | ---- | ---- | ---- |

While we have described our invention in connection with specific embodiments and applications, other modifications thereof will be readily apparent to those skilled in this art without departing from the spirit and scope of the invention as defined in the appended claims.

What we claim is:

1. The improvement in the method of producing halogenated diphenylsulphones by the condensation of a halogenated benzene sulphohalide and a compound selected from the group consisting of benzene and halogenated benzenes containing at least one hydrogen on the halogenated benzene ring in the presence of a condensation agent which comprises treating the halogenated benzene sulphohalide with an oxidizing agent selected from the group consisting of nitric acid, nitrates, chromates, bichromates, chlorates, manganese dioxide manganates, permanganates and peroxides at a time at least prior to the completion of the condensation reaction.

2. The improvement in the method of producing halogenated diphenylsulphones by the condensation of a halogenated benzene sulphohalide and a compound selected from the group consisting of benzene and halogenated benzenes containing at least one hydrogen on the halogenated benzene ring in the presence of a condensation chloride which comprises treating the halogenated benzene sulphohalide with an oxidizing agent selected from the group consisting of nitric acid, nitrates, chromates, bichromates, chlorates, manganese dioxide, manganates, permanganates and peroxides at a time at least prior to the completion of the condensation reaction.

3. The improvement in the method of producing halogenated diphenylsulphones by the condensation of a halogenated benzene sulphohalide and a compound selected from the group consisting of benzene and halogenated benzenes containing at least one hydrogen on the halogenated benzene ring in the presence of a condensation chloride which comprises treating the halogenated benzene sulphohalide with nitric acid at a time at least prior to the completion of the condensation reaction.

4. The improvement in the method of producing halogenated diphenylsulphones by the condensation of a halogenated benzene sulphohalide and a compound selected from the group consisting of benzene and halogenated benzenes containing at least one hydrogen on the halogenated benzene ring in the presence of aluminum chloride which comprises treating the halogenated benzene sulphohalide with a nitrate at a time at least prior to the completion of the condensation reaction.

5. The method of claim 3 in which about 40 to 60% by weight of nitric acid is employed.

6. The method of claim 5 in which about 50% by weight of nitric acid is employed.

7. The method of claim 2 in which the amount of the oxidizing agent employed is capable of producing about 0.002–0.2 g. eq. of oxygen per gram mole of the halogenated sulphohalide treated.

8. The method of claim 2 in which the amount of the oxidizing agent employed is capable of producing about 0.02 to 0.1 g. eq. of oxygen per gram mole of the halogenated sulphohalide treated.

9. The method of claim 8 in which the treatment of the halogenated-benzene sulphohalide with the oxidizing agent is carried out at a time, at least 5 minutes prior to the addition of the other reagents.

10. The method of claim 9 in which 2,4,5-trichlorobenzene sulphochloride is condensed with monochlorobenzene to produce 2,4,5,4'-tetrachlorobenzenesulphochloride.

No references cited.

UNITED STATES PATENT OFFICE
CERTIFICATE OF CORRECTION

Patent No. 3,057,925                                  October 9, 1962

Cornelis Johannes Schoot et al.

It is hereby certified that error appears in the above numbered patent requiring correction and that the said Letters Patent should read as corrected below.

In the heading to the printed specification between lines 8 and 9, insert the following:

Claims priority, application Netherlands May 17, 1958

Signed and sealed this 16th day of April 1963.

(SEAL)
Attest:

ERNEST W. SWIDER
Attesting Officer

DAVID L. LADD
Commissioner of Patents